Oct. 20, 1959  W. O. BACKMAN  2,908,979
PRECISION DIVIDER SETTING DEVICE
Filed May 20, 1958  3 Sheets-Sheet 1

INVENTOR.
WILLIAM O. BACKMAN
BY
Munn & Liddy
ATTORNEYS

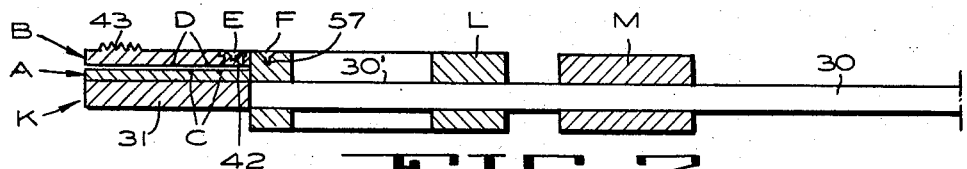
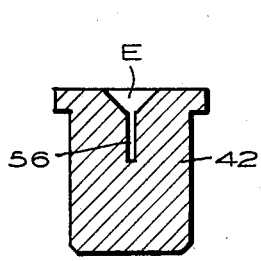
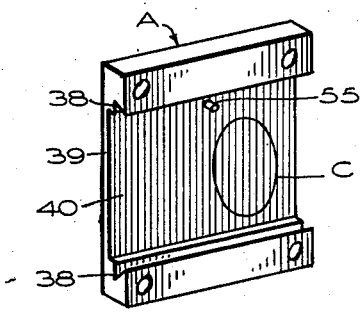
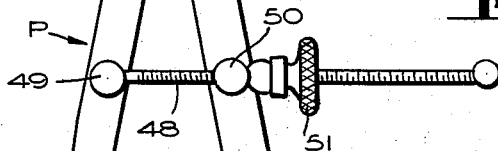
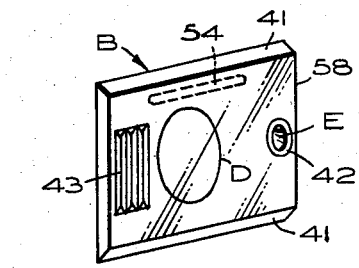
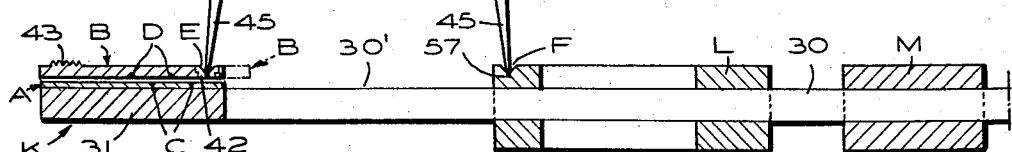
INVENTOR.
WILLIAM O. BACKMAN
BY
Munn & Liddy
ATTORNEYS

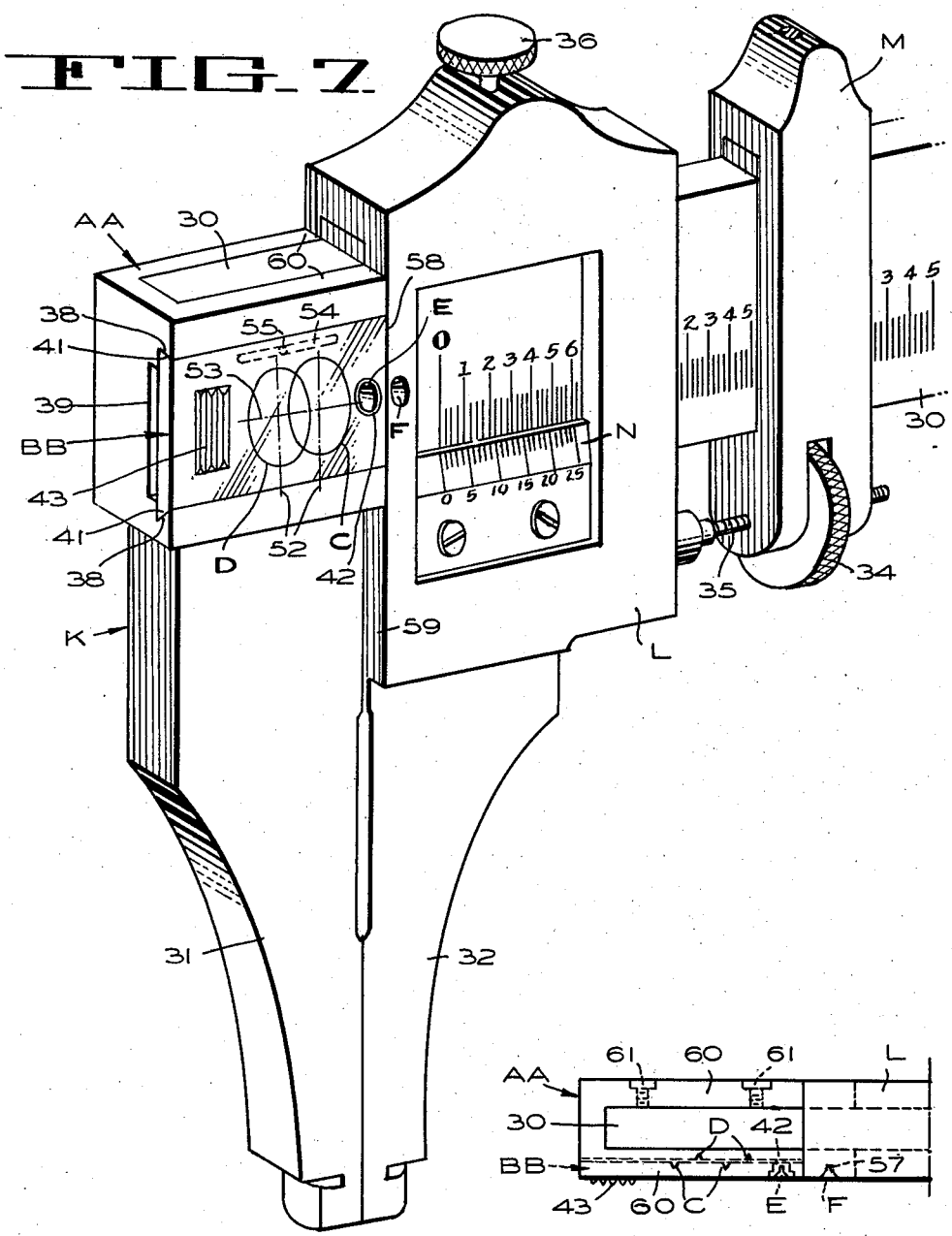

United States Patent Office 2,908,979
Patented Oct. 20, 1959

2,908,979
PRECISION DIVIDER SETTING DEVICE

William O. Backman, Fair Oaks, Calif.

Application May 20, 1958, Serial No. 736,541

9 Claims. (Cl. 33—143)

The present invention relates to improvements in a precision divider setting device. It consists of the combinations, constructions, and arrangement of parts, as hereinafter described and claimed.

An object of my invention is to provide a precision divider setting device which will enable machinists, tool and die makers, design engineers, draftsmen, etc., to accurately set dividers to a predetermined measurement to the degree of accuracy which is embodied in the conventional type of vernier calipers. In addition, point to point measurements may be picked up with the dividers and, by a reverse process, the desired reading may be taken from the vernier calipers.

Conventional vernier calipers now on the market are provided with a conical hole in the adjustable vernier frame, while a dot within a circle is provided on the fixed leg of the calipers. The setting of dividers by these conventional calipers is a close approximation, predicated upon the accuracy with which the user is able to visually gauge the positioning of the infinitesimally small point of the moving leg of the dividers with respect to the center of the dot that lies at the center of the circle on the fixed leg of the vernier calipers.

The major drawback to the method employed in such conventional calipers lies in the fact that in order to properly place the movable point of the dividers in the center of the dot, the dividers must be held in a vertical position, thus partially obscuring the point of the dividers. If, in trying to overcome this objection, the user tries tilting the dividers a slight bit in order to sight the point of the dividers, a degree of accuracy is lost, because the fixed and movable points of the dividers must be raised from the bottom of the conical hole in the vernier frame and the dot on the fixed leg, respectively. As the angle of tilting increases for the purpose of improving visibility, so does the probability of error increase.

These objections, namely, the difficulty of visually centering an infinitesimally small point of the dividers in the center of a small dot, and the awkwardness of holding the dividers in the proper position so that the movable point of the dividers can be clearly seen while centering it in the dot, are completely overcome in the present precision divider setting device. This result is accomplished by the simple expedient of allowing all adjustments of the dividers to be made in the ideally vertical position, while at the same time permitting the user to determine, without eye-strain, the accuracy of the point position of the dividers without the necessity of dislodging in any manner the fixed point of the dividers from its proper position in the bottom of the conical hole in the vernier frame, and without the necessity of looking at the infinitely small point of the dividers while the final adjustment is being made. In this manner, the probability of error is greatly diminished, especially by removing the eye-strain resulting in the current method of divider setting.

Another object of my invention is to provide a precision divider setting device which is simple in construction, durable and efficient for the purpose intended.

Other objects and advantages will appear as the specification proceeds. The novel features will be set forth in the claims hereunto appended.

Drawings

For a better understanding of my invention, reference should be had to the accompanying drawings, forming part of this specification, in which:

Figure 2 is a horizontal sectional view taken along the plane II—II of Figure 1;

Figure 3 is a view similar to Figure 2, but showing the movable leg of the caliper separated from the fixed leg thereof, and further illustrating a pair of machinist's dividers being used for a setting of the latter;

Figure 4 is a sectional view taken through a metal insert, which is provided in a slide of my device;

Figures 5 and 6 are pespective views of a fixed frame and a slide, respectively, of the device shown in Figure 1;

Figure 7 is a perspective view of a modified form of my precision divider setting device, this form being adapted to be clamped to a pair of conventional vernier calipers without requiring any alteration in the latter; and Figue 8 is a fragmentary top plan view of the left-hand portion of Figure 7.

Figure 1:
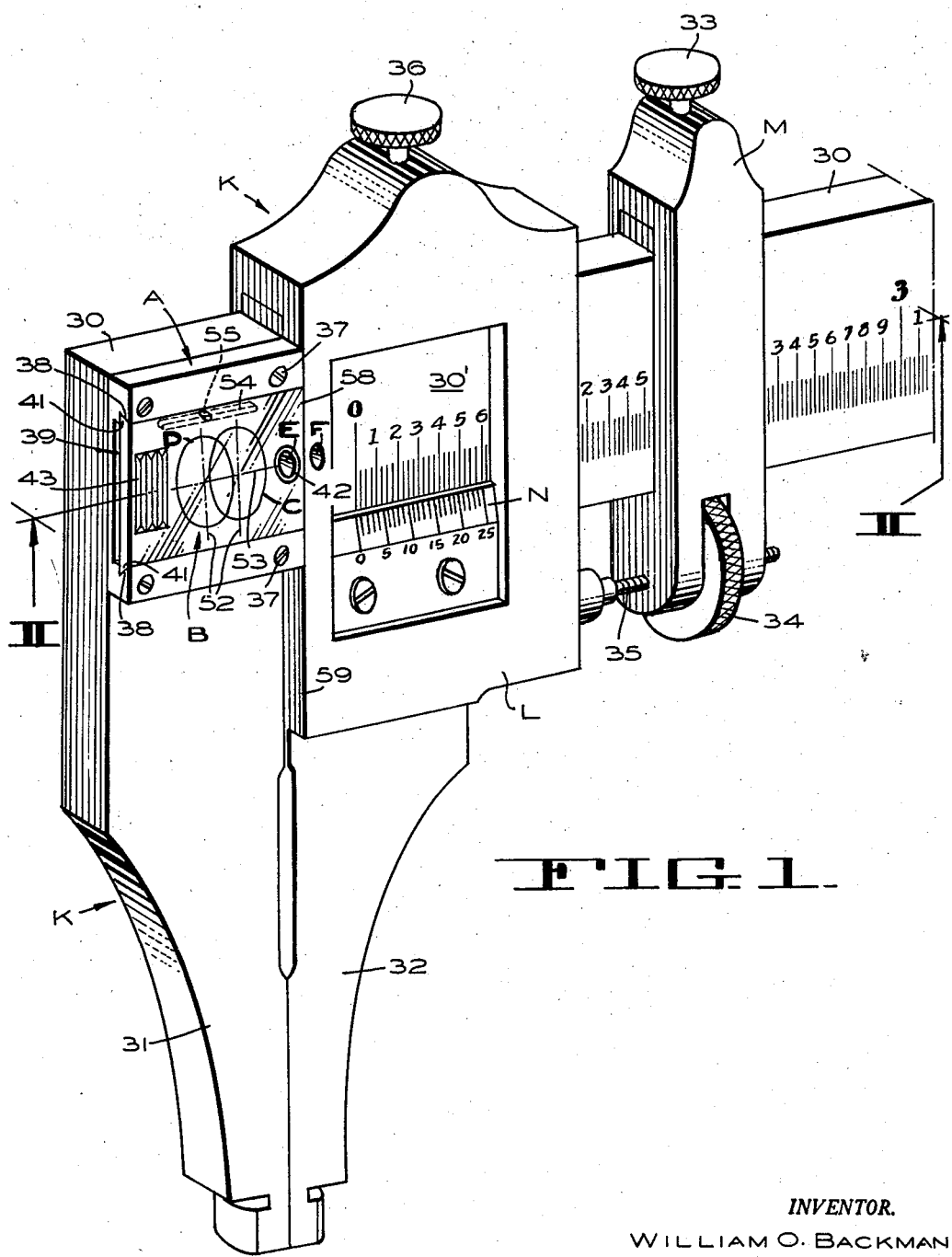
Figure 1 is a perspective view of vernier calipers with my precision divider setting device applied thereto.

While I have shown only the preferred forms of my invention, it should be understood that various changes, or modifications, may be made within the scope of the annexed claims without departing from the spirit thereof.

Detailed description

Referring now to the drawings in detail, I have shown a pair of conventional vernier calipers which are designated generally at K. These calipers define a longitudinal bar 30 having a fixed leg 31 projecting therefrom and at right angles with respect to the general length of the bar 30. A vernier frame L and a sliding lock M are mounted on the bar more movement therealong. As clearly shown in Figure 1, the vernier frame L is provided with a leg 32 fixed thereto, which constitutes the movable leg of the calipers. The sliding lock M may be adjusted along the length of the bar 30 so as to bring the movable leg 32 into an approximate desired position relative to the fixed leg 31, and then a lock screw 33 may be tightened so as to hold the sliding lock M fixed with respect to the bar 30. Now a thumb screw 34 carried by the lower part of the sliding lock M may be actuated so as to move the vernier frame L into a final position of adjustment, it being noted that a threaded shaft 35 extends from the thumb screw 34 and is operatively connected to the vernier frame L.

It will be noted that the bar 30 is graduated in fortieths or .025 of an inch, in the conventional manner, every fourth division, representing a tenth of an inch, being numbered, as indicated by "1" to "9," inclusive, in Figure 1. On the vernier frame L there is provided the usual vernier plate N, which has a scale divided into twenty-five parts and numbered "0," "5," "10," "15," "20" and "25." The twenty-five divisions on the vernier plate N occupy the same space as twenty-four divisions on the bar 30. The difference between the width of one of the twenty-five spaces on the vernier plate N and one of the twenty-four spaces on the bar 30 is therefore 1/1000 of an inch. The setting and reading of verniers are well known in the art and need not be explained in detail.

When the vernier frame L has been adjusted into a final desired position, it may be held there by tightening a lock screw 36 in the conventional manner. It will be apparent from Figure 1 that when the legs 31 and 32 abut one another, the "0" on the vernier plate N will register with the "0" on the bar 30.

As clearly shown in the drawings, I have mounted a fixed dovetailed frame A on the left-hand end of the bar 30, that is, near the fixed leg 31. The frame A may be secured in place by any suitable means. For this purpose, I have shown countersunk screws 37 in Figure 1, which are threaded into the upper portion of the fixed leg 31. The frame A may be made of steel, plastic or any other suitable material, and it is fashioned with dovetailed grooves 38 therein, these grooves extending lengthwise of the frame A, as clearly shown in Figure 5.

Moreover, the fixed frame A has a slightly recessed or undercut section 39 in its base to allow clearance for a slide B, and to allow space for affixing a layer of colored pigment 40 (as suggested by the vertical hatching in Figure 5), if desired. This clearance is required so that slide B will not rub against any undercut portion of the frame A which, of necessity for optical purposes, must remain unmarred. It will be noted that slide B is provided with bevelled upper and lower edges 41 which have a sliding fit with the dovetailed grooves 38.

On the upper side of the fixed dovetailed frame A, a circle C is affixed, either by engraving, imprinting, or any other suitable means so that the circle C will be readily discernible against the background of the undercut or recessed section 39 of the frame A. The clearance between the underside of the slide B and the undercut section 39 of the frame A should be held to the irreducible minimum in order to enhance the accuracy with which a circle D on the slide B may be aligned concentrically with the circle C in the manner and for the purpose that will be explained later.

The slide B may be made of transparent plastic, or other suitable material, and the circle D is engraved, imprinted or otherwise suitably affixed on the underside of this slide. The circle D is so positioned that when the slide B is moved from its initial position, as shown in Figures 1 and 2, to the right, as suggested by the dot-dash lines in Figure 3, it will be possible to position the circle D so that it will appear to be exactly concentric with the circle C when viewed from directly above. In order to achieve this apparent concentricity, it will readily be seen that the irreducible minimum of clearance above referred to between the undercut portion 39 of the fixed frame A and the underside of the slide B will enhance the apparent junction of the two circles C and D into one plane; and, therefore, will produce the optimum apparent concentricity. Radial dimensions of the circles C and D must be identical; in a like manner, linear intensity or width of the line should be identical in order to achieve the apparent concentricity of the two circles.

It will be observed that the slide B and the vernier frame L are provided with conical holes E and F, respectively. In order to provide resistance against wear, the conical hole E should preferably be formed in some hard material, such as tool steel, and preferably in the form of a pressed-in insert 42 (see Figures 1 to 4, inclusive). Any suitable method of retaining this insert in place may be used.

In order to understand the functions of the circles C and D, it must be assumed that the distance between the centers of these circles is exactly equal to the linear distance between the bottoms of the conical holes E and F, when the vernier is set at zero; that is, the legs 31 and 32 are together and the "0" on the vernier plate N registers with the "0" on the bar 30, as disclosed in Figure 1.

These conical holes E and F are constructed so as to slide in the same plane in such a manner that, were it hypothetically possible to slide the dovetailed slide B to the right so as to merge with the vernier frame L, the bottoms of the conical holes E and F would coincide. In this manner, if it is assumed that the distance between the centers of these two circles to be ⅛ of an inch, then by the same token the distance between the bottoms of the conical holes E and F will also be ⅛ of an inch, with the vernier set at zero reading. It will be understood, of course, that the vernier calipers have been shown on an enlarged scale in Figure 1 for the purpose of clarity.

It may be considered that the circle C on the frame A is the fixed or "target" circle. By means of a serrated or knurled section 43 on the upper surface of the slide B it will be possible by means of finger pressure to move the slide B back and forth, within certain limits; and, assuming that the vernier frame L is not in a position to obstruct movement to the right, to move the circle D so that it will appear to be exactly concentric with the fixed or "target" circle C, as previously mentioned.

Referring now to Figure 3, I have shown a pair of machinist's dividers P in use, although it should be understood that other types of dividers may be used. As shown, the dividers P consist of a pair of legs 44 having pointed lower ends 45, which are adapted to be inserted into the conical holes E and F. Moreover, a bearing rod 46 is provided between the upper ends of the legs 44, and a crescent-shaped spring 47 engages with the tops of the legs so as to urge the pointed ends 45 of the dividers apart. A threaded shaft 48 is anchored to one of the legs 44 by a bracket 49 and the shaft 48 passes through a swivel bracket 50 carried by the other leg 44 of the dividers. A knurled adjusting nut 51 is threaded on the outer end of the shaft 48 and bears against the bracket 50. By turning the nut 51, the pointed ends 45 of the dividers may be adjusted toward or away from one another in the usual way.

It will be readily seen from the foregoing description that it will be an easy matter to accurately set the dividers P by the simple expedient of setting the vernier plate N to the prescribed measurement and then proceeding as follows: One end 45 of the dividers should be placed in the conical hole F in the vernier frame L, and then the dividers P should be adjusted by turning the adjusting nut 51 to the approximate distance between the conical holes E and F; and then applying finger pressure to the serrated or knurled section 43 so as to move the slide B until the other pointed end 45 of the dividers P registers with the bottom of the hole E.

At this point, all that remains to be done to bring the dividers P into accurate setting will be to adjust the dividers in the proper direction until concentricity of circles C and D has been achieved. It will be apparent that adjustment of the dividers in this manner will slidably move the dovetailed slide B as readily as may be done with finger pressure.

Conversely, if it should be desirable to accurately determine the point spacing of the dividers P, as for instance, after using the dividers to pick up the dimension between two points on the surface of a sphere, the first step would be to place one pointed end 45 of the dividers in the conical hole E in the slide B; then manually adjust the sliding vernier frame L until the conical hole F in the frame L approximately registers with the other pointed end 45 of the dividers; then remove the divider point 45 from the conical hole E. At this time, the divider points are not in contact with either conical hole. Then the user should insert one of the pointed ends 45 of the dividers in the conical hole F, and then with finger pressure the user should adjust the slide B until both pointed ends 45 of the dividers register in their respective conical holes. Now all that remains to be done to complete the reading will be to manually adjust the vernier by means of the thumb screw 34 until the circles C and D become concentric. The direct reading at this time will give the correct point space reading of the dividers.

It can readily be seen that once concentricity of the circles C and D has been achieved that even the slightest movement of the circle D laterally, with respect to the fixed or "target" circle C, will be discernible due to the relative difference between the appearance in the thickness of the lines of the circles at the vertical and horizontal axes 52 and 53, respectively, of interception with the circles.

It has been found that with sharply engraved lines for the circles, two to five thousandths of an inch in width, and after concentricity has been achieved, a displacement of as little as 1/1000 of an inch can be readily detected visually, by noting the comparative disparity between the thickness of the lines at the points of intersection of the vertical and horizontal axes 52 and 53, respectively, with the circumferences of the two circles. The width of engraving or imprinting of the circular lines for the circles C and D can be arbitrarily set at any desired dimension, but ideally should be in the range of 2/1000 inch to 5/1000 inch.

The slide B may be limited in lateral motion to any practical linear dimension by construction in its underside of a longitudinal groove 54, positioned along its line of lateral movement, together with a pin 55 protruding from the fixed frame A and extending into the groove 54. This arrangement acts as a sort of "keeper," preventing accidental separation of the slide B from the fixed frame A.

It will be understood, of course, that at zero setting of the vernier calipers K, the divider setting assembly (consisting of the fixed frame A and the slide B) must be mounted so that the spacing of the conical holes E and F will be exactly equal to the distance between the centers of the circles C and D.

With particular reference to Figure 4, it will be observed that a very fine elongated bore 56 extends downwardly into the metal insert 42 from the bottom of the conical hole E. The purpose of this bore is to prevent the divider point 45 from hitting the bottom of the hole E, thus permitting the divider point to center in the hole E with greater accuracy. It will be clear from both Figures 2 and 3 that the conical hole F is likewise fashioned with a very fine elongated bore 57 at its bottom and for the same purpose as mentioned in connection with the bore 56.

It should be understood that, although in this description, I have referred to a minimum setting of 1/8 inch, this setting is arbitrary. The conventional vernier calipers now on the market, and briefly referred to in the earlier part of this specification, have a similar limitation. In the precision divider setting device disclosed herein, it should be understood that so long as the arbitrary minimum setting of 1/8 inch is adhered to, this will mean that the center of the conical hole E is 1/16 inch from the right-hand side edge 58 of the slide B; and that the conical hole F in the vernier frame L will also be 1/16 inch from the left-hand edge 59 of the vernier frame L (see Figure 1). Also, assuming that in my device that the slide B is kept abutting the vernier frame edge 59, while at the same time moving the vernier frame L to the right until concentricity of circles C and D is achieved, then a total movement of 1/8 inch will be observed and the vernier calipers will read 1/8 inch.

Figures 2 and 3 clearly disclose the fact that the conical holes E and F are spaced vertically the same distance from the face 30' of the bar 30. This will facilitate the use of the calipers P, since the latter may be held vertically when the pointed ends 45 are inserted into the conical holes E and F.

Referring now to the modified form of my invention, as shown in Figures 7 and 8 of the drawings, the construction and operation of the vernier calipers K are identical with the form previously described. Accordingly, like reference characters will be applied to corresponding parts. In the modived form, however, the fixed frame AA (the counterpart of frame A in the first form) is so constructed as to present a pair of spaced-apart legs 60, which are adapted to straddle and slip over the left-hand end of the bar 30 or the top of the fixed leg 31. Set-screws 61 are provided for holding the frame AA in place (see Figure 8). The slide BB in the modification is identical with the slide B previously described, except for the fact that it is slightly longer. The fixed frame AA is provided with an engraved or imprinted circle C, while the slide BB has an engraved or imprinted circle D. Likewise, the slide BB has a conical hole E therein, while the vernier frame L is provided with a conical hole F.

It will be apparent that the circles C and D in Figures 7 and 8 are identical with the circles C and D in Figure 1 and serve the same purpose. Also, the conical holes E and F in Figures 7 and 8 are arranged in the same manner and are used in the same way as the conical holes E and F in Figure 1. Accordingly, no further description of the modified form is deemed necessary.

It should be understood that I do not wish to be restricted only to those cases where the slides B and BB about the vernier frame L, as it will be readily perceived that a portion of the material may be removed from the right-hand side edge 58 of the slide B or BB so that instead of there being 1/16 inch between the edge 58 and the center of the conical hole E, this dimension might be reduced so as to bring the right-hand edge 58 practically to the edge of the conical hole E, without in any way affecting the utility of the device.

I claim:

1. The combination with vernier calipers which is provided with a bar having a graduated scale progressively increasing from a zero reading; the calipers further having a vernier frame adjustable along the length of the bar; the vernier frame having a conical hole in an exposed face thereof, which is adapted to have one of the pointed ends of a pair of dividers inserted thereinto; and the calipers also having a fixed leg extending from the bar; of a precision dividers setting device comprising: a guide frame secured to the fixed leg of the vernier calipers; the guide frame being fashioned with longitudinal guide grooves which extend lengthwise relative to the bar and in a direction toward the vernier frame; a transparent slide mounted in the guide grooves, and being movable into abutting relation with the vernier frame when the latter is set at zero reading; the slide having a conical hole in an exposed face thereof, which is adapted to have the other pointed end of the dividers inserted thereinto; the guide frame having a circle affixed thereto which is viewable through the transparent slide; the slide also having a circle affixed thereto which is movable into concentric relation with the circle on the guide frame, when the slide is moved into a predetermined position; the linear distance between the centers of the two circles being equal to the linear distance between the centers of the two conical holes, when the vernier frame is set at zero reading and the slide is moved into abutting relation with the vernier frame.

2. The combination as defined in claim 1; and in which the radial dimensions of the two circles are identical, and the width of the lines defining the two circles are identical, so that the circle on the slide may be arranged exactly concentric with the circle on the slide frame and resulting in giving the appearance of a single circle of uniform width of line throughout the circumference thereof, when viewed from directly above.

3. The combination as defined in claim 1; and in which the two circles are arranged in planes that are disposed close to one another to produce the optimum apparent concentricity.

4. The combination as defined in claim 1; and in which the guide frame has a slightly undercut section in its base to allow clearance for the slide so that the slide will not rub against the undercut section of the guide frame.

5. The combination as defined in claim 4; and in which the undercut section of the guide frame has a layer of colored pigment affixed thereto.

6. The combination as defined in claim 1; and in which the slide is provided with a hard metal insert; the conical hole in the slide being fashioned in this insert.

7. The combination as defined in claim 1; and in which each of the conical holes is provided with a very fine elongated bore at its bottom to prevent the pointed end of the divider from hitting the bottom of the hole; and to permit the pointed end of the divider to center in the hole with greater accuracy.

8. The combination as set forth in claim 1; and in which the guide frame is substantially rectangular in outline and is abutted against a face of the fixed leg of the vernier calipers; and means removably securing the guide frame to the fixed leg.

9. The combination as set forth in claim 1; and in which the guide frame is constructed so as to present a pair of spaced-apart legs, which are adapted to straddle and slip over the top portion of the fixed leg; and means removably securing the guide frame to the fixed leg.

No references cited.

UNITED STATES PATENT OFFICE

CERTIFICATE OF CORRECTION

Patent No. 2,908,979 October 20, 1959

William O. Backman

It is hereby certified that error appears in the printed specification of the above numbered patent requiring correction and that the said Letters Patent should read as corrected below.

Column 2, line 43, for "more" read -- for --; column 6, line 3, for "modived" read -- modified --; line 26, for "about" read -- abut --.

Signed and sealed this 5th day of April 1960.

(SEAL)
Attest:

KARL H. AXLINE
Attesting Officer

ROBERT C. WATSON
Commissioner of Patents